US009715326B2

(12) United States Patent
Yuan

(10) Patent No.: US 9,715,326 B2
(45) Date of Patent: Jul. 25, 2017

(54) SUPERIMPOSED ANNOTATION OUTPUT

(75) Inventor: Xiaoru Yuan, Beijing (CN)

(73) Assignee: PEKING UNIVERSITY, Beijing (CN)

( * ) Notice: Subject to any disclaimer, the term of this patent is extended or adjusted under 35 U.S.C. 154(b) by 566 days.

(21) Appl. No.: 13/502,011

(22) PCT Filed: Mar. 16, 2011

(86) PCT No.: PCT/CN2011/071854
§ 371 (c)(1),
(2), (4) Date: Apr. 13, 2012

(87) PCT Pub. No.: WO2012/122706
PCT Pub. Date: Sep. 20, 2012

(65) Prior Publication Data
US 2013/0027425 A1 Jan. 31, 2013

(51) Int. Cl.
*G09G 5/00* (2006.01)
*G06F 3/0484* (2013.01)
(Continued)

(52) U.S. Cl.
CPC ........ *G06F 3/0484* (2013.01); *G06F 3/04883* (2013.01); *G06F 17/30817* (2013.01);
(Continued)

(58) Field of Classification Search
USPC ....................................................... 345/629
See application file for complete search history.

(56) References Cited

U.S. PATENT DOCUMENTS 5,600,775 A    2/1997   King et al.
5,893,126 A *   4/1999   Drews ................... G06F 3/0481
                                                                    715/203
(Continued)

FOREIGN PATENT DOCUMENTS

CN    101473294 A    7/2009
CN    101505396 A    8/2009
(Continued)

OTHER PUBLICATIONS

Fan et al., "A Sketch-Based Interface for Collaborative Design", EUROGRAPHICS Workshop on Sketch-Based Interfaces and Modeling, Grenoble, France, Aug. 30-31, 2004, 1-10.
(Continued)

*Primary Examiner* — Abderrahim Merouan
(74) *Attorney, Agent, or Firm* — Dorsey & Whitney LLP

(57) ABSTRACT

Technologies are generally described for systems and methods effective to display a first output and simultaneously display a second output corresponding to user input superimposed on the first output. In some examples, a second output is displayed on a display simultaneously with and superimposed on a first output. The second output corresponds to user input. In an area of the display that the first output and the second output overlap, the second output is opaque and the first output is visible through the opaque second output. In an area of the display that the first output and the second output do not overlap, the first output is visible. The first output may be a video portion of a video telephone conference, and the second output may correspond to annotations or notes that are received from a user during the telephone conference.

22 Claims, 10 Drawing Sheets

(51) Int. Cl.
*H04N 21/43* (2011.01)
*H04N 21/431* (2011.01)
*H04N 21/4788* (2011.01)
*H04N 21/63* (2011.01)
*G06F 17/30* (2006.01)
*G06F 3/0488* (2013.01)

(52) U.S. Cl.
CPC ....... *H04N 21/431* (2013.01); *H04N 21/4307* (2013.01); *H04N 21/4788* (2013.01); *H04N 21/632* (2013.01)

(56) References Cited

U.S. PATENT DOCUMENTS

| | | | | |
|---|---|---|---|---|
| 7,716,376 | B1* | 5/2010 | Price | G06F 1/12 709/248 |
| 2002/0173345 | A1 | 11/2002 | Swerup et al. | |
| 2003/0196201 | A1* | 10/2003 | Schein | G06F 3/0481 725/42 |
| 2004/0138948 | A1* | 7/2004 | Loomis | G11B 20/10 700/94 |
| 2005/0273700 | A1 | 12/2005 | Champion et al. | |
| 2008/0276272 | A1* | 11/2008 | Rajaraman et al. | 725/37 |
| 2009/0064245 | A1* | 3/2009 | Facemire | H04N 7/17318 725/105 |
| 2009/0119100 | A1 | 5/2009 | Akella et al. | |
| 2009/0193032 | A1* | 7/2009 | Pyper | G06Q 30/02 |
| 2010/0070878 | A1* | 3/2010 | Amento | G11B 27/034 715/751 |
| 2010/0241691 | A1* | 9/2010 | Savitzky et al. | 709/203 |
| 2011/0154399 | A1* | 6/2011 | Jin | H04N 21/44213 725/46 |
| 2013/0347029 | A1* | 12/2013 | Tang | G06F 17/30029 725/32 |
| 2014/0186002 | A1* | 7/2014 | Hanaya | G06F 3/011 386/200 |
| 2014/0201773 | A1* | 7/2014 | Neumeier | H04N 5/44591 725/19 |
| 2016/0042723 | A1* | 2/2016 | Lee | G06T 3/0056 345/639 |
| 2016/0089923 | A1* | 3/2016 | Philippe | C09D 11/50 283/67 |

FOREIGN PATENT DOCUMENTS

| | | |
|---|---|---|
| EP | 0836114 A1 | 4/1998 |
| EP | 1489818 A1 | 12/2004 |
| EP | 1613021 A2 | 1/2006 |
| JP | 02193489 A | 7/1990 |
| JP | H037487 A | 1/1991 |
| JP | 03038178 A | 2/1991 |
| JP | 05242143 A | 9/1993 |
| JP | 1028250 A | 1/1998 |
| JP | 2000050226 A | 2/2000 |
| JP | 2000341572 A | 12/2000 |
| JP | 2001186430 A | 7/2001 |
| JP | 2001250332 A | 9/2001 |
| JP | 2004193979 A | 7/2004 |
| JP | 2010251919 A | 11/2010 |
| WO | WO 01/65832 A1 | 9/2001 |

OTHER PUBLICATIONS

International Patent Application No. PCT/CN11/071854: International Search Report dated Dec. 22, 2011, 10 pages.
Kipp, "The video annotation research tool", www.anvil-software.de, © Sep. 2000, accessed Apr. 29, 2010, 2 pages.
"Video Conferencing Articles," accessed at http://web.archive.org/web/20110301020232/http://www.articlesbase.com/video-conferencing-articles/, accessed on Aug. 21, 2014, pp. 1-9.
Extended European Search Report for EP 11860725.8 (EP counterpart appl.) mailed on Oct. 17, 2014.
Aita, A., et al., "Development of "Spot Annotation," System for Visual Data Management on Observation Activity", IEICE Tech. Rep., vol. 110, No. 147, pp. 27-32 (Jul. 2010) (See English Abstract).

* cited by examiner

SUPERIMPOSED ANNOTATION OUTPUT

CROSS-REFERENCE TO RELATED APPLICATION

This application is the U.S. National Stage filing under 35 U.S.C. 371 of International Application No. PCT/CN2011/071854, filed on Mar. 16, 2011, the disclosure of which is incorporated herein by reference in its entirety.

BACKGROUND

Modern computing devices provide the capability to run multiple programs simultaneously. Desktop computers, laptop computers, tablet computers, personal digital assistants, and even mobile phones have multi-processing capabilities that allow for multiple applications to run at the same time. Accordingly, in an example scenario, users of such devices may execute a first program for playing video and simultaneously execute a second program for recording user inputs such as notes.

Computing devices that have a generous display such as, for example, a desktop or laptop computer may accommodate simultaneously displaying a video in a first application and recording user inputs in a second application. But for computing devices such as mobile phones and personal digital assistants that have relatively small displays, simultaneous viewing of two applications is difficult, if not sometimes impossible. Furthermore, depending upon the nature of the applications and the user's intended use of those applications, switching between application programs is not a useful alternative. For example, a user may wish to view a video stream, which may be, for example, a video telephone conference, while simultaneously take notes regarding the video stream. On a device such as a mobile phone or PDA that has a relatively small display, simultaneously presenting both the application to view the video stream and the application for taking notes is not possible. Furthermore, switching between the two applications prevents the user from simultaneously engaging in both activities (viewing the video and taking notes), which if not for the limits of the technology, the user would otherwise wish to do.

SUMMARY

Technologies are generally described for systems and methods effective to display a first output and simultaneously display a second output corresponding to user input superimposed on the first output. In an area of the display that the first output and the second output overlap, the second output is opaque and the first output is visible through the opaque second output. In an area of the display that the first output and the second output do not overlap, the first output is visible.

In an example scenario, the first output may be a video stream of a video telephone conference. The second output comprises annotations or notes that are received from a user during the telephone conference. The annotations or notes may correspond to user inputs received on the display on which the first output is displayed. The display may be a touch sensitive display, for example, and the user inputs may be handwritten notes or annotations entered on the display while the video stream of a telephone conference is displayed on the display. Accordingly, while video from a video telephone conference is being displayed, the operator may make notes or annotations on the display, and the markings or outputs corresponding to those user inputs are displayed superimposed on the video output. In an area of the display that the video, i.e., the first output, and the annotations, i.e., the second output, overlap, the annotations are opaque and the video is visible through the opaque second output. In an area of the display that the first output and the second output do not overlap, the first output is visible.

According to another aspect of the disclosed embodiments, the first output and the second output may be stored along with information synchronizing the two outputs. For example, in the example scenario wherein the first output is a video output and the second output comprises user-entered notes or annotations, both the video and the annotations are stored along with the synchronizing information recording the time that the particular notes or annotations were displayed relative to the video. The first output, the second output, and the synchronization information may be retrieved at a later time and used to display the outputs according to the timing sequence of the originally displayed outputs. For example, in the example scenario wherein the stored first output is a video and the stored second output represents notes or annotations that were made during the playing of the video, the retrieved stored video is played and the annotations superimposed on the playing video at the appropriate intervals to recreate the timing that the original markings were made relative to the playing video.

According to another aspect of the disclosed embodiments, the notes or annotations may be moved on, or removed from, the display in response to user commands and/or predetermined preferences and rules enforced (or applied) by the displaying device. For example, in the example scenario wherein the first output is a video output and the second output comprises user-entered notes or annotations, the user may request that annotations or notes be moved on the display. The user may drag on the annotations to indicate a desire to move the annotations to a different portion of the display. Similarly, in response to user input, the system may remove the currently displayed annotations from the display. In another embodiment, the device may comprise predefined rules that specify the second output should be moved to a particular portion of the display, or removed from the display, after having been displayed for a prescribed period of time.

This Summary is provided to introduce a selection of concepts in a simplified form that are further described below in the Detailed Description of Illustrative Embodiments. This Summary is not intended to identify key features or essential features of the claimed subject matter, nor is it intended to be used to limit the scope of the claimed subject matter. Other features are described below.

DETAILED DESCRIPTION OF ILLUSTRATIVE EMBODIMENTS

Figure 1:
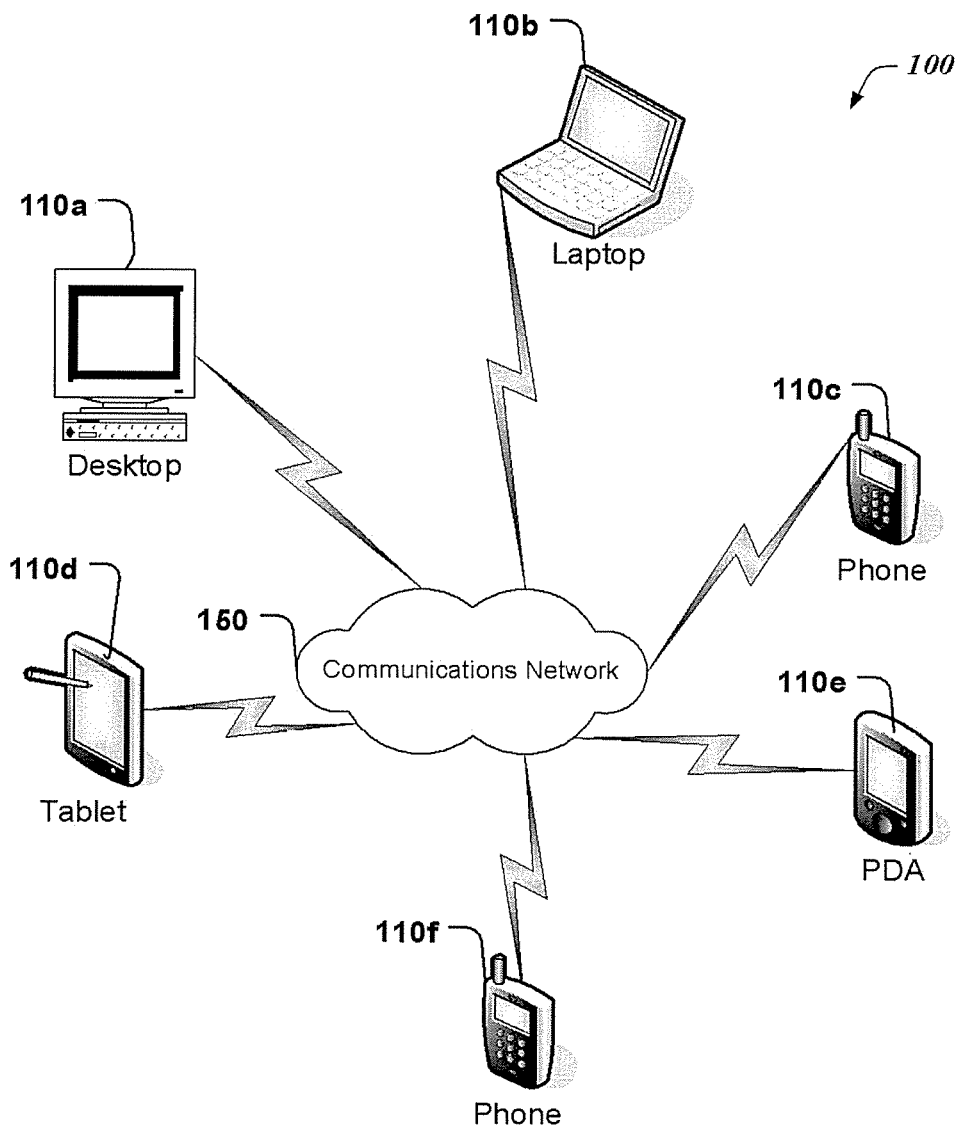
FIG. 1 depicts an illustrative computing arrangement in which aspects of the subject matter described herein may be implemented.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Overview

Modern computing devices provide the capability to run multiple programs simultaneously. Accordingly, in an example scenario, users may execute a first program for playing video and simultaneously execute a second program for recording user inputs such as notes. Computing devices that have a generous display interface such as, for example, a desktop or laptop computer may accommodate simultaneously displaying a video in a first application and recording user inputs in a second application. But for computing devices such as mobile phones and personal digital assistants that have relatively limited or small display interfaces, simultaneous viewing of two applications is difficult.

Technologies are generally disclosed for systems and methods effective to display a first output and simultaneously display a second output corresponding to user input superimposed on the first output. In an area of the display that the first output and the second output overlap, the second output is opaque and the first output is visible through the opaque second output. In an area of the display that the first output and the second output do not overlap, the first output is visible. In an example scenario, the first output may be a video portion of a video telephone conference, and the second output may be annotations or notes that are received from a user during the telephone conference. The annotations or notes may be received on the display on which the first output is displayed.

Example Computing Arrangement

FIG. 1 depicts an illustrative computing arrangement in which aspects of the subject matter described herein may be implemented. In particular, FIG. 1 illustrates an example computing arrangement 100 comprised of computing devices 110 each of which may be adapted to provide superimposed output as described herein. Devices 110 may comprise, for example, any of desktop computer 110$a$, laptop computer 110$b$, phone 110$c$, tablet computing device 110$d$, personal digital assistant (PDA) 110$e$, and mobile phone 110$f$, each of which may be adapted to simultaneously display two output feeds, for example, from two executing applications. In an example scenario, any one of devices 110$a$-$f$ may display output of a first application, e.g., display a video output, and simultaneously display input to a second application, e.g., display notes or annotations that were entered by the device operator. More particularly, any one of devices 110$a$-$f$ may be programmed to display a video while simultaneously receiving handwritten annotations on a touch screen display and displaying markings corresponding to the annotations on the display. In an alternate scenario, any of devices 110$a$-$f$ may display a still image and simultaneously display inputs that were entered by the device operator while the image was displayed.

Each of devices 110 may be adapted to communicate with communications network 150. Communications network 150 may be any type of network that is suitable for providing communications between computing devices 110$a$-$f$ and any servers accessed by devices 110$a$-$f$. Communications network 150 may comprise a combination of discrete networks which may use different technologies. For example, communications network 150 may comprise local area networks (LANs), wide area networks (WAN's), cellular networks, or combinations thereof. Communications network 150 may comprise wireless, wireline, or combination thereof. In an example embodiment, communications network 150 comprises the Internet and may additionally comprise any networks adapted to communicate with the Internet. Communications network 150 may comprise a wireless telephony network that is adapted to communicate video, audio, and other data between devices 110. In a particular scenario, a telephony network is adapted to communicate video telephone conferences between devices 110.

Figure 2:
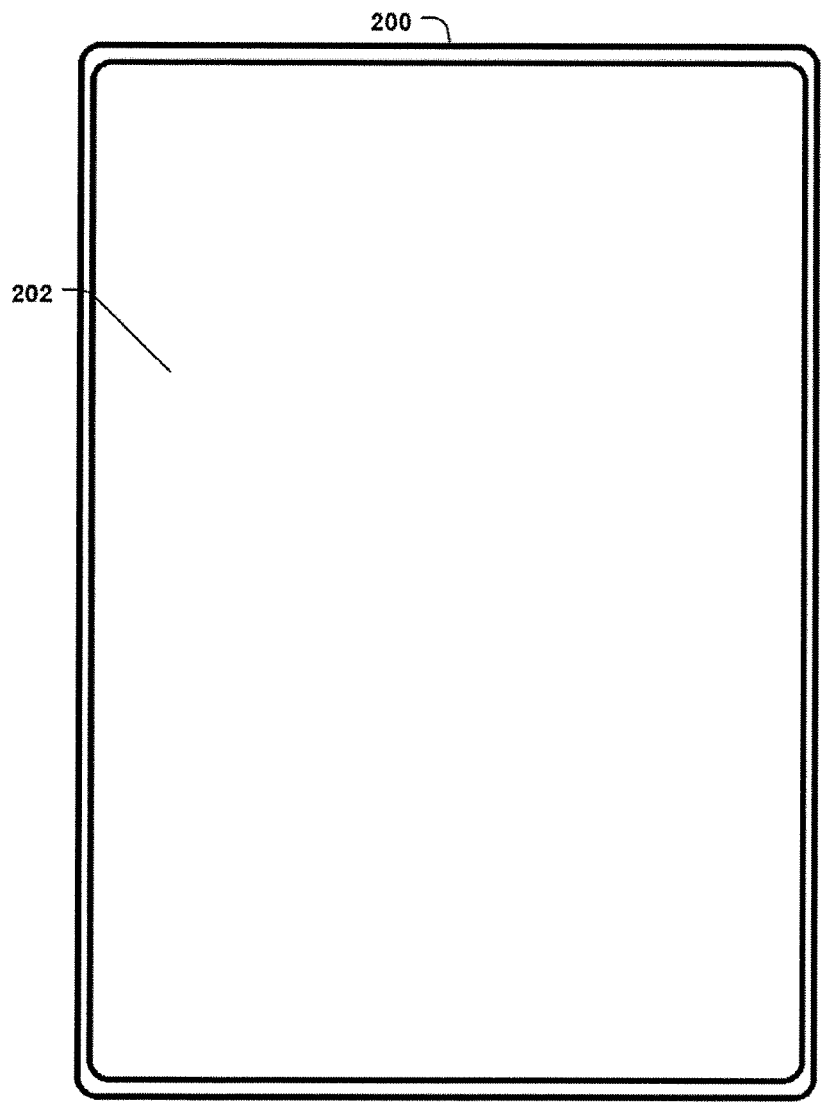
FIG. 2 depicts an illustrative display interface apparatus.

FIG. 2 depicts an illustrative display apparatus 200. Display apparatus 200 may be employed as a display component in any of the devices depicted in FIG. 1, although the size of display apparatus 200 may vary depending on the particular system of which it is a part. For example, if display apparatus 200 is comprised in desktop system 110$a$, it likely will be larger than in the circumstance that display apparatus 200 is comprised in phone 110$f$ or PDA 110$e$. Display apparatus 200 may be any device suitable for electronically displaying output and may be adapted to display, for example, video, still images, text, graphics, as well as any other type of output that may be electronically represented. In an example embodiment, display apparatus 200 may also comprise an input device such as, for example, a touch sensitive screen 202. In an example embodiment, touch sensitive screen 202 is adapted to receive inputs on its surface and generate electronic markings on display apparatus 200 at locations corresponding to the location of inputs. For example, a user may use his/her fingers and hands and/or a pointing device such as a stylus on touch sensitive screen 202 to enter inputs, which are reflected by electronic markings being displayed on display apparatus 200 at locations corresponding to the inputs.

Figure 3:
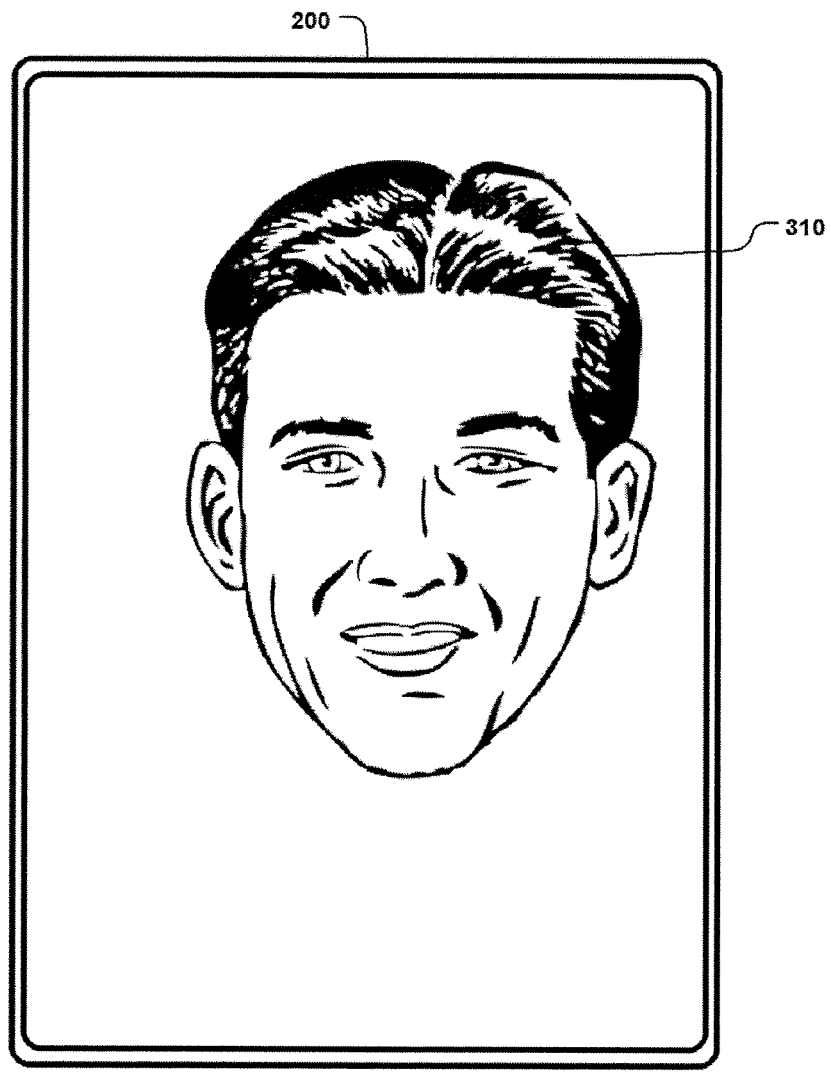
FIG. 3 depicts an illustrative display apparatus with a first output displayed thereon.

FIG. 3 depicts illustrative display apparatus 200 with first output 310 displayed thereon. In the illustrative embodiment of FIG. 3, first output 310 represents a person's image. In an example scenario, first output 310 may be a video image, and may be, for example, the video stream of a video telephone conference. While in the example depicted in FIG. 3 first output 310 illustrates the likeness of a person, and represents a video output, first output 310 may represent any type of likeness and may be any type of content including, for example, still images, graphics, and/or text. Moreover, first output 310 may be any output that is presented on display apparatus 200.

Figure 4:
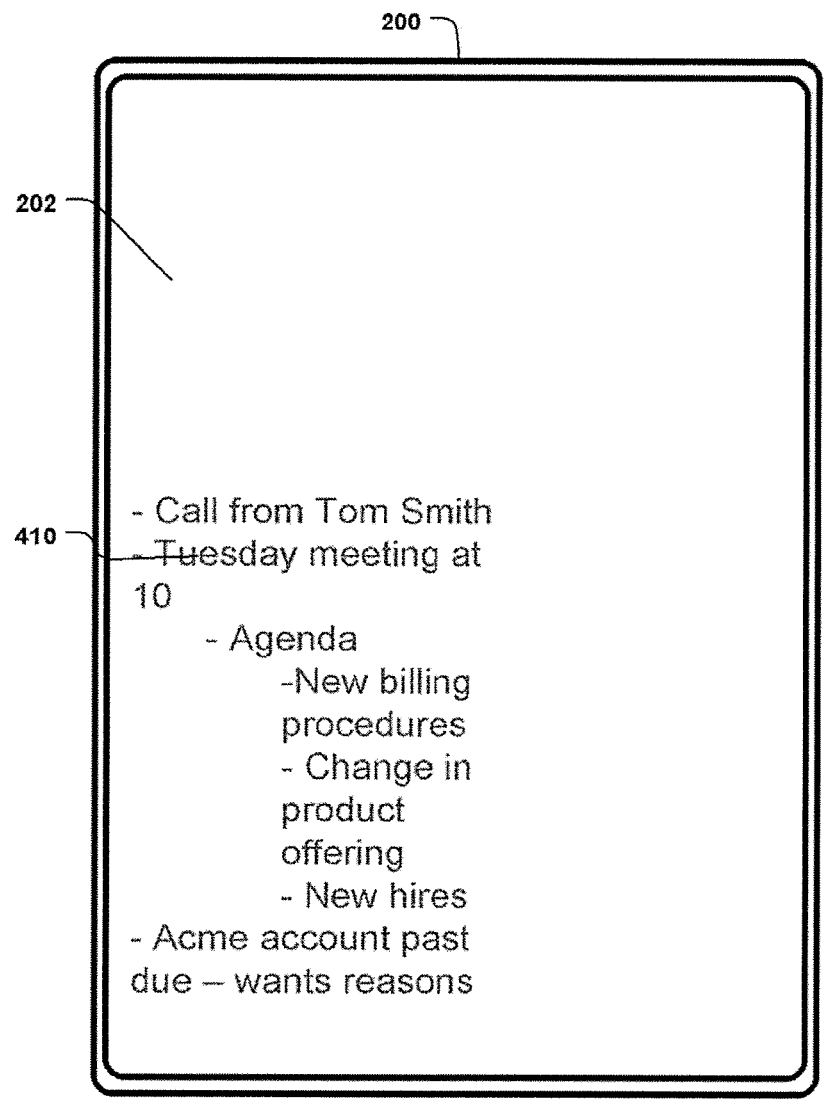
FIG. 4 depicts an illustrative display apparatus with a second output displayed thereon.

FIG. 4 depicts illustrative display apparatus 200 with second output 410 displayed thereon. In the illustrative embodiment of FIG. 4, second output 410 is text. In an example scenario, second output 410 may be text corresponding to user input. More particularly, second output 410 may comprise text corresponding to user input received on touch sensitive screen 202 or entered through some other input means such as, for example, a keyboard or computerized voice recognition. While in the example depicted in FIG. 4 second output 410 illustrates text, second output 410 may represent any type of content including, for example, video, still images, graphics, and/or text.

Thus, as depicted in FIG. 3 and FIG. 4, display apparatus 200 is adapted to display first output 310, which in an example embodiment, may be a video feed of a telephone conference, and second output 410, which in an example embodiment may be text or annotations corresponding to user input. For devices such as, for example, mobile phone 110f and PDA 110e, display apparatus 200 will likely not be large enough to accommodate simultaneously displaying both first output 310 and also second output 410. Furthermore, switching between the two outputs that are displayed on display apparatus 200 is less than advantageous as it prevents the user from engaging in more than one activity at one time.

Figure 5:
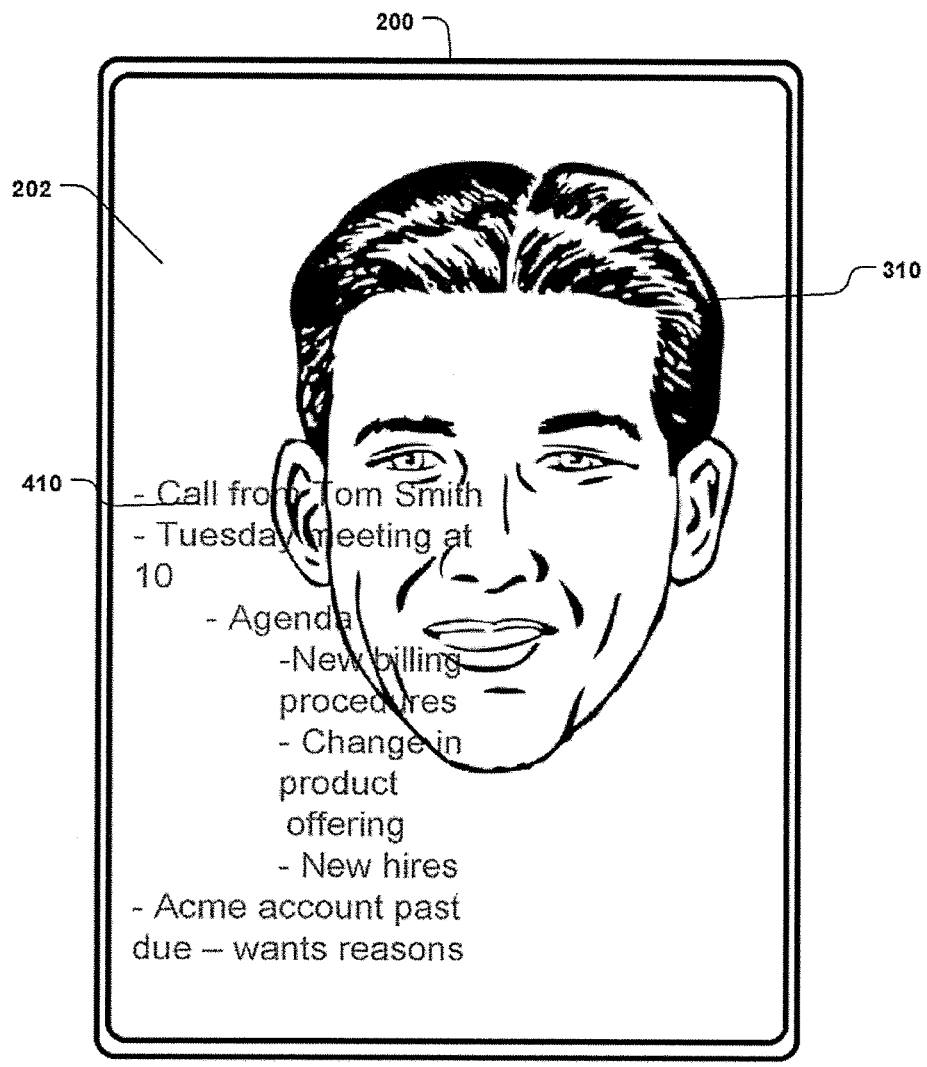
FIG. 5 depicts an illustrative display apparatus with two outputs simultaneously displayed therein thereon.

In an illustrative embodiment, any one of devices 110a-f may comprise display apparatus 200 which is adapted to superimpose two outputs. FIG. 5 depicts illustrative display apparatus 200 with two outputs simultaneously displayed thereon. As shown, first output 310 is displayed and second output 410 is displayed superimposed on top of first output 310. In the area of display apparatus 200 wherein second output 410 overlaps first output 310, second output 410 is opaque, but first output 310 is visible beneath second output 410. In areas where first output 310 is not overlapped by second output 410, first output 310 is plainly visible. Second output 410 may have a level of transparency that allows for first output 310 to be viewable beneath second output 410. The level of opaqueness of second output 410 may be varied and thereby increase or decrease the visibility of first output 310 in the portions that they two overlap. Furthermore, second output 410 may be displayed with a particular coloring scheme so as to be more or less discernible while still allowing first output 310 to be visible. In the scenario wherein second output 410 corresponds to user inputs entered on touch sensitive screen 202, second output 410 may be displayed using a particular color of grey that stands out relative to the background on which it is displayed. In alternative embodiments, the color of second output 410 may be red, yellow, black, or any other color that is suitable for the application in order to make second output 410 more or less discernible.

First output 310 may be any type of data including, for example, video, still images, graphics, text, etc. In an example scenario, first output 310 may be a video stream, and more particularly, a video stream portion of an audio/video telephone conference. Second output 410 may be output corresponding to user inputs received while viewing the video stream. The user input may be received by any suitable means. In an example scenario, the user inputs may be received on touch sensitive screen 202. In such a scenario, the user of display apparatus 200 may view first output 310 and simultaneously enter notes or annotations on touch sensitive screen 202. Second output 410 corresponding to the received user inputs is superimposed on first output 310. The user is able to view first output 310 and simultaneously capture and display notes and annotations, i.e., second output 410 that may be prompted by first output 310. In the scenario wherein first output 310 is a video stream of a telephone conference, the person participating in the call is able to continue to participate in the telephone call and view the video while also taking notes or annotations on touch sensitive screen 202. In this scenario, first output 310 continues to be visible and discernible even though second output 410 is superimposed thereon. The combination of displaying a video on display apparatus 200 while simultaneously presenting handwritten annotations creates the sensation of talking with someone behind a glass separator on which notes may be recorded.

Figure 6:
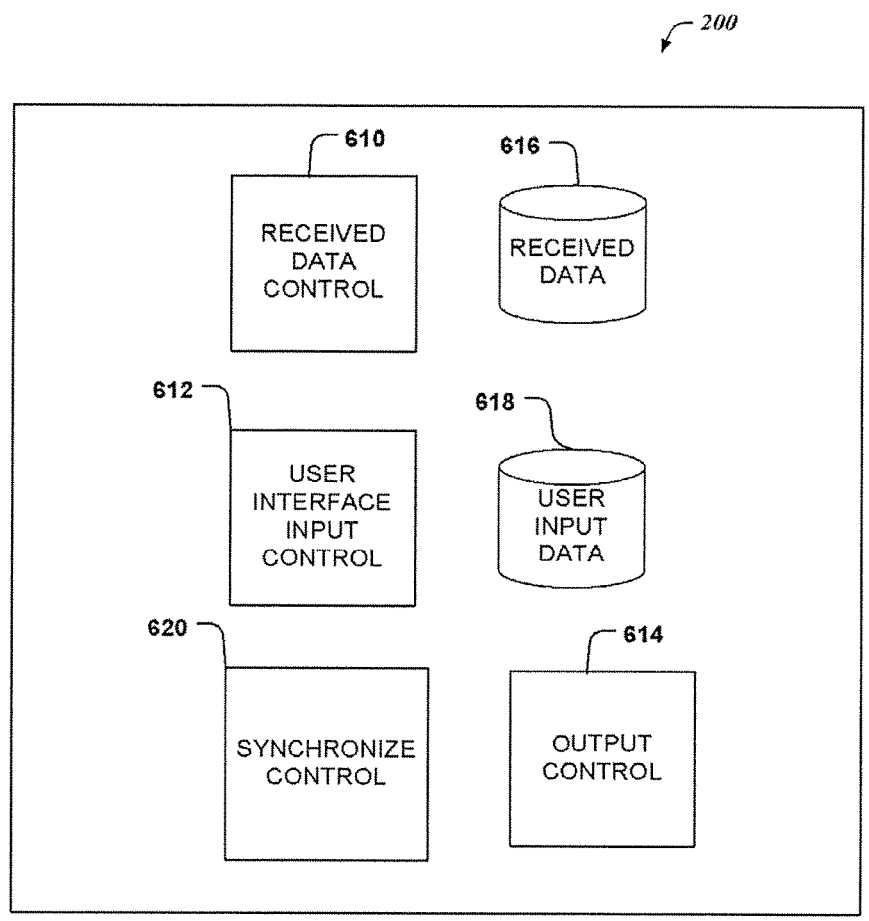
FIG. 6 depicts a block diagram of example logical components comprised of an illustrative computing device that is adapted to provide superimposed display outputs.

FIG. 6 depicts a block diagram of example logical components comprised of an illustrative computing device 110 that is adapted to provide superimposed display outputs. The logic components may be comprised of any type of computing device including, for example, desktop 110a, laptop 110b, phone 110c, tablet computing device 110d, PDA 110e, and mobile phone 110f. In an example embodiment, an illustrative device 110 may comprise received data control logic 610 that operates to receive data for display on display apparatus 200. For example, received data control logic 610 may be adapted to coordinate the receipt of a video stream or any type of data including, for example, still images, text, and/or graphics.

In an example embodiment, illustrative device 110 may further comprise user interface input control logic 612 which operates to control the user inputs received from, for example, a touch sensitive screen, a keyboard, etc. In an example scenario wherein device 110 is adapted to display a still image or video stream of a video conference, user interface input control logic 612 may be adapted to receive inputs from a touch sensitive screen 202. User interface input control logic 612 may be adapted to receive any type of user inputs including, for example, video, images, still images, text, and graphics. Likewise, user interface input logic 612 may be adapted to control inputs from any suitable input device including, for example, touch sensitive screens or displays, physical keyboards, virtual keyboards, pointing mice, computerized voice recognition systems, etc. User interface input logic 612 and received data control logic 610 may be comprised in the same or separate software applications.

Output control logic 614 is adapted to control the device output. For example, output control logic 614 may allow for the display of first output 310 on display apparatus 200 and superimpose second output 410 on first output 310. In an example scenario, output control logic 614 may be adapted to display a video stream of a video conference and annotations corresponding to user inputs superimposed on the video stream. In another example scenario, output control logic 614 may be adapted to display still images and annotations received from touch sensitive screen 202. Output control logic 614 may be comprised in a common program application with received data control logic 610 and user interface input control logic 612, but alternatively may be separate from one or more applications comprising received data control logic 610 and user interface input control logic 612.

Output control logic 614 may be adapted to maintain the integrity of first output 310 and second output 410 while the two outputs are displayed on display apparatus 200. In other words, the distinctness of second output 410 is maintained even though changes may be made to first output 310 while second output 410 is superimposed on first output 310. For example, where first output 310 comprises video output, which by its nature, changes over time, the distinctness and sharpness of second output 410 is not impacted by the successive change in a video stream comprised in first output 310. Output control logic 614 may buffer data corresponding to outputs 310 and 410 prior to display, and map the buffered data for second output 410 over the buffered data for first output 310. For example, output control logic 614 may map data for second output 410 and first output 310 to pixels locations on display apparatus 220. The mapping allows for controlling the integrity of separate outputs 310 and 410. Output control logic 614 may then communicate the second output 410 data mapped onto first output 310 data for display.

Received data store 616 comprises logic and computing memory for storing data that is received and displayed on display apparatus 200. For example, received data store 616 stores a copy of first output 310. In an example scenario wherein device 110 is adapted to receive a video stream of a video conference, the video stream and corresponding audio stream may be stored in received data store 616.

User input data store 618 comprises logic and computing memory for storing data corresponding to user inputs and their corresponding outputs. For example, in an example scenario wherein user inputs are received on a touch sensitive screen 202, data corresponding to the inputs, as well as the corresponding outputs that were generated on the display apparatus 200 are stored in user input data store 618. Also, any data that may be used for synchronizing the user input data and corresponding outputs with any other outputs such as, for example, video outputs, may be stored in user input data store 618. For example, information regarding timing of the receipt of inputs and generation of corresponding output relative to the display of a video may be recorded. The timing information may be any type of information that is suitable for synchronizing the display of two outputs consistent with the timing intervals of the original display. The timing information may comprise absolute timing information or may be timing information that is relative to the playing time of the first output. For example, the timing information may specify that a particular second output was displayed at three minutes into the play time of a corresponding first output.

Synchronization control logic 620 is adapted to control the synchronized display of stored data. For example, in response to a request to display stored data 616, synchronization control logic is adapted to retrieve data from stores 616 and 618 and use the synchronization information stored in store 618 in order to have output control logic 614 display the stored data consistent with the timing of the original display of the two output streams. For example, in an example scenario wherein output corresponding to user inputs received on touch sensitive screen 202 was displayed superimposed on a video stream presented on display apparatus 200, synchronization control logic 620 may be adapted to present the corresponding stored data from data stores 616 and 618 in a manner that is consistent with the timing and sequence that applied when the two outputs were originally displayed.

Superimposed Outputs Processing

Figure 7:
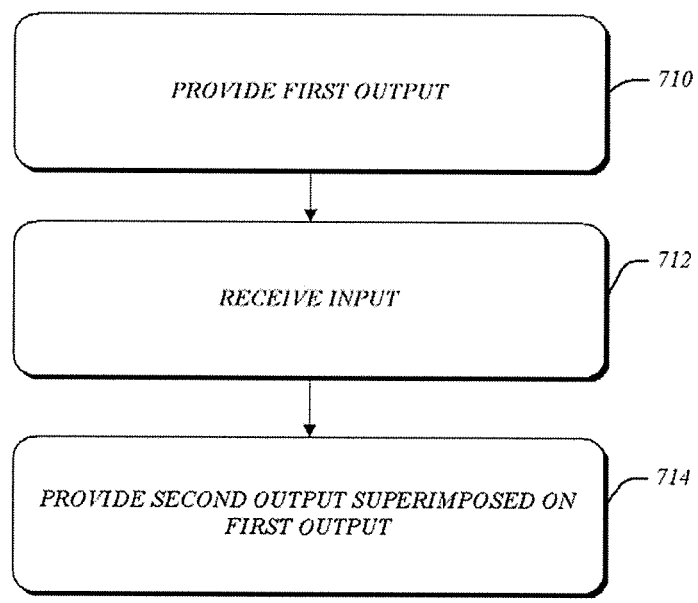
FIG. 7 is a flow diagram of an example process for presenting a second output superimposed on a first output.

FIG. 7 is a flow diagram of an example process for presenting second output 410 superimposed on first output 310. The example process may be implemented on any suitable device including, for example, any of devices 110a-f. An example process may include one or more operations, actions, or functions as illustrated by one or more of blocks 710, 712, and/or 714. Moreover, for this and other processes and/or methods described herein, although illustrated as discrete blocks, various blocks may be divided into additional blocks, combined into fewer blocks, or eliminated, depending on the desired implementation. Processing may begin at block 710.

At block 710 (PROVIDE FIRST OUTPUT), first output 310 is displayed on display apparatus 200. First output 310 may be any output suitable to be displayed on display apparatus 200. For example, first output 310 may be video, images, still images, text, graphics, or any other output type. In one example scenario, first output 310 may comprise the video stream of a telephone conference. Simultaneously with displaying video, audio corresponding to the video may be output by a speaker component of device 110. Processing may continue from block 710 to block 712.

At block 712 (RECEIVE INPUT), user input is received at device 110. The inputs may be any that are suitable to be received on device 110 and may comprise, for example, touch inputs, mechanical inputs, and/or audio inputs. Further, the inputs may be received via any suitable input device, including, for example, a touch sensitive screen, a physical keyboard, a virtual keyboard, a mouse, a microphone with voice recognition software, etc. In an example scenario, inputs are received on touch sensitive screen 202 while first output 310 is displayed on display apparatus 200. More particularly, handwritten inputs may be received on touch sensitive screen 202 while a video stream, which may be a video telephone conference stream, is displayed on display apparatus 200. Processing may continue from block 712 to block 714.

At block 714 (PROVIDE SECOND OUTPUT SUPERIMPOSED ON FIRST OUTPUT), second output 410, which corresponds to the user inputs received at block 712, is displayed on display apparatus 200. Second output 410 is displayed simultaneously with, and superimposed on first output 310. In an area of display apparatus 220 that first output 310 and second output 410 overlap, second output 410 is opaque and first output 310 is visible through opaque second output 410. Second output 410 may be, at least in part, transparent so first output 310 may be visible on display apparatus 200. In an area of display apparatus 200 that first output 310 and second output 410 do not overlap, first output 310 is visible.

In the area of display apparatus 200 that second output 410 overlaps first output 310, the degree or level of opaqueness, and conversely, the level of transparency may vary depending upon the preferences of the device operator. Thus, the level of the opaqueness may vary from very opaque to very transparent. Analogously, the degree to which first output 310 is partially obscured or darkened by second output 410 in the area that the two overlap, may vary from greatly to only slightly. Indeed, in some embodiments, first output 310 may be almost completely obscured, while in other embodiments, first output 310 is only slightly obscured.

In an example scenario, wherein at block 712, notes or annotations are received as inputs into device 110 while first output 310 is displayed, at block 714, markings, annotations, and/or notes corresponding to the inputs are displayed on display apparatus 200 at locations corresponding to the inputs. More particularly, wherein handwritten annotations or notes are received by a user on a touch sensitive screen 202, corresponding annotations are displayed on display apparatus 200 superimposed on first output 310 which may be, for example, the video output of an audio/video conference. In an alternate embodiment, annotations are made on a physical or virtual keyboard and corresponding notes or annotations are displayed on display apparatus 200 superimposed on first output 310. In yet another embodiment, user inputs are entered through computerized voice recognition and corresponding outputs are displayed on display apparatus 200 superimposed on first output 310.

In an example scenario, device 110 operates to maintain the integrity of first output 310 and second output 410 while the two outputs are displayed on display apparatus 200. In other words, the distinctness of second output 410 is maintained even though changes may be made to first output 310 while second output 410 is superimposed on first output 310. Likewise, the distinctness and integrity of first output 310 is maintained even though changes may be made to second output 410 while second output 410 is superimposed on first output 310. In an example scenario, first output 310 comprises video output. By its nature, video output changes over time so as to depict motion. The distinctness and sharpness of second output 410 is not impacted by the successive change in a video stream comprised in first output 310. Likewise, in a scenario wherein second output 410 changes over time such as, for example, when successive handwritten notes are received, the distinctness of first output 310 is maintained.

In connection with providing outputs at block 714, device 110 may maintain the integrity and distinctness of outputs 310 and 410 in any suitable manner. In an example embodiment, display apparatus 220, consistent with the typical operation of display devices, continuously refreshes the data that is presented. In an example scenario, device 110 may buffer data corresponding to outputs 310 and 410 prior to display. Device 110, and in particular output control logic 614, may map the buffered data for second output 410 into or over the buffered data for first output 310. For example, output control logic 614 may map data for second output 410 and first output 310 to pixels locations on display apparatus 220. The buffering and mapping allows for controlling the integrity of separate outputs 310 and 410. Data comprising second output 410 data mapped onto first output 310 data is then displayed by display apparatus 220. The logic for buffering and mapping the data prior to display may be implemented, for example, by a graphics and/or display controller that controls the pixel display on display apparatus 220.

Figure 8:
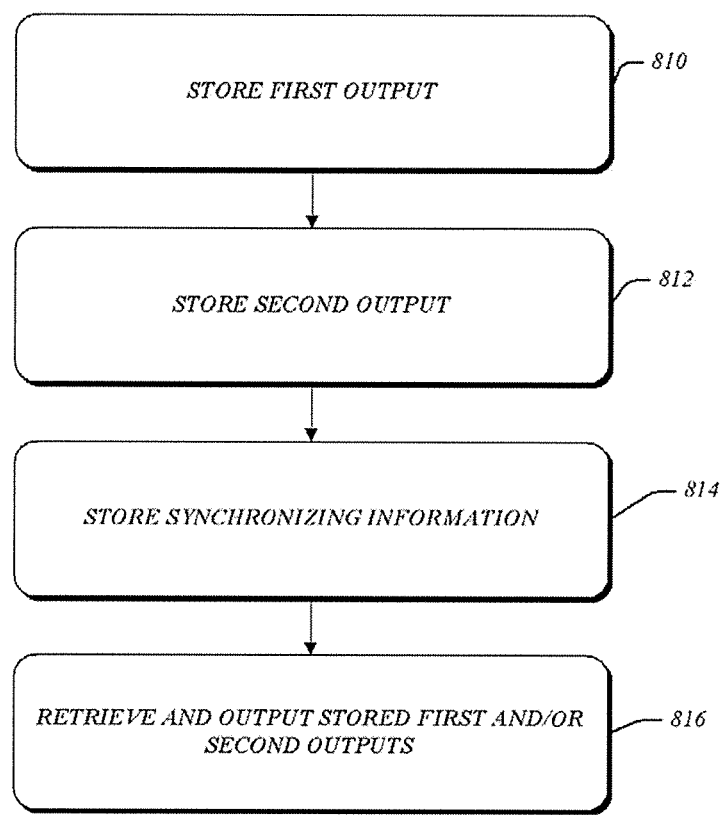
FIG. 8 is a flow diagram of an example process for storing and retrieving a first output and a second output.

According to another aspect of the potential embodiments, first and second outputs 310 and 410 may be stored and later retrieved and displayed. The outputs may be retrieved and displayed separately and independently. However, the outputs may also be retrieved and displayed simultaneously, with the outputs being synchronized and displayed in the same relative timing as was used when the outputs were originally displayed. FIG. 8 is a flow diagram of an example process for storing and retrieving first output 310 and second output 410. An example process may include one or more operations, actions, or functions as illustrated by one or more of blocks 810, 812, 814, and/or 816. Processing may begin at block 810.

At block 810 (STORE FIRST OUTPUT), first output 310 is stored in, for example, database store 616. For example, in an example scenario wherein first output 310 is the output of a video telephone conference, the video stream and, in some scenarios, the audio stream are stored in database store 616. Processing may continue from block 810 to block 812.

At block 812 (STORE SECOND OUTPUT), second output 410 and the corresponding user inputs are stored or recorded, for example, in database store 618. For example, in an example scenario, wherein user inputs were received and displayed as notes or annotations on display apparatus 200, at block 812, those annotations are stored in database store 618. Processing may continue from block 812 to block 814.

At block 814 (STORE SYNCHRONIZING INFORMATION), information synchronizing second output 410 with first output 310 is stored. For example, synchronization information may be stored in user input data store 618. The synchronization information that is stored may be any data useful in recording and recreating the temporal arrangement of second output 410 relative to first output 310. In other words, data indicating when second output 410 was displayed relative to first output 310 may be recorded. In an example scenario, wherein first output 310 is a video stream of an audio/video conference, and second output 410 comprises annotations or notes corresponding to user inputs, synchronization information captures the times at which various second outputs 410 were displayed relative to the playtime of first output 310. By way of example, wherein second output 410 was displayed thirty seconds into displaying first output 310 which comprises a video stream, the synchronization information comprises information recording that second output 410 was displayed 30 seconds into the video stream. In an embodiment wherein audio portions of first output 310 are recorded, information synchronizing audio with second output 410 may also be recorded. Processing may continue from block 814 to 816.

At block 816 (RETRIEVE AND OUTPUT STORED FIRST AND/OR SECOND OUTPUTS), the stored data for first output 310 and/or stored data for second output 410 may be retrieved and displayed. For example, where stored first output 310 comprises a video stream and an audio stream, and stored second output 410 comprises annotations that were made and superimposed on the video stream, at block 816, the stored information may be retrieved from memory and displayed. As mentioned, second output 410 and first output 310 are synchronized so that second output 410 is displayed at an appropriate time relative to first output 310 consistent with the relative timing of display when first output 310 and second output 410 were originally displayed. In an example embodiment, stored first output 310 may comprise video and audio, and stored second output 410 may comprise annotations. All may be retrieved from memory and output consistent with the stored synchronization information. In another scenario, only one or a portion of the stored outputs may be replayed. For example, second output 410, which may comprise notes or annotations, may be displayed separately from first output 310. In another example scenario, second output 410 may be retrieved and displayed while an audio portion of first output 310 is replayed. In such a scenario, the annotations or notes are displayed synchronized with the audio replay so as to be consistent with the temporal placement of the notes or annotations relative to the audio stream.

According to another aspect of the disclosed embodiments, second output 410 may be moved and/or removed from display apparatus 200. Such functionality may be particularly useful wherein display apparatus 200 is relatively small and second output 410 covers too much of, or a particular portion of, display apparatus 200. Second output 410 may be moved on display apparatus 200 so as to be less obtrusive. Alternatively, or in addition, second output 410 may be removed from display apparatus 200.

Figure 9:
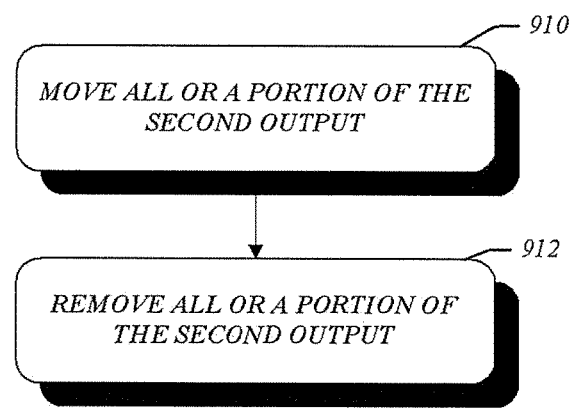
FIG. 9 is a flow diagram of an example process for moving a second output on a display apparatus and removing a second output from a display apparatus.

FIG. 9 is a flow diagram of an example processes for moving a second output on a display apparatus and/or removing a second output from a display apparatus. An example process may include one or more operations, actions, or functions as illustrated by one or more of blocks 910 and/or 912. Processing may begin at block 910.

At block 910 (MOVE ALL OR A PORTION OF THE SECOND OUTPUT), all or a portion of second output 410 may be moved on display apparatus 200. For example, second output 410 may be moved so as to have a smaller amount of overlap with first output 310. Thus, in an example embodiment, second output 410 may be moved on display apparatus 200 in response to a user input. For example, second output 410 may be moved in response to a mouse cursor dragging on second output 410. In an example embodiment, second output 410 may be moved automatically by device 110 after a prescribed period of time. For example, second output 410 may be moved automatically by device 110 to a particular portion of display apparatus 200 such as, for example, the bottom portion, after second output 410 has been displayed for 5 minutes. Processing may continue from block 910 to 912.

At block 912 (REMOVE ALL OR A PORTION OF THE SECOND OUTPUT), all or a portion of second output 410 may be removed from display apparatus 200. For example, second output 410 may be removed in response to user input or in response to rules or requirements enforced or applied by device 110. In an example scenario, second output 410 may be removed from display apparatus 200 in response to user input. For example, a user may select to clear all or a portion of the notes or annotations that are displayed on display apparatus 200 so as to make space for additional notes or annotations. In an example embodiment, device 110 may comprise rules that specify outputs corresponding to user inputs should be removed after a prescribed period of time has expired. For example, after an output has been displayed for 10 minutes, device 110 may remove display apparatus 200.

Example Computing Environment

Figure 10:
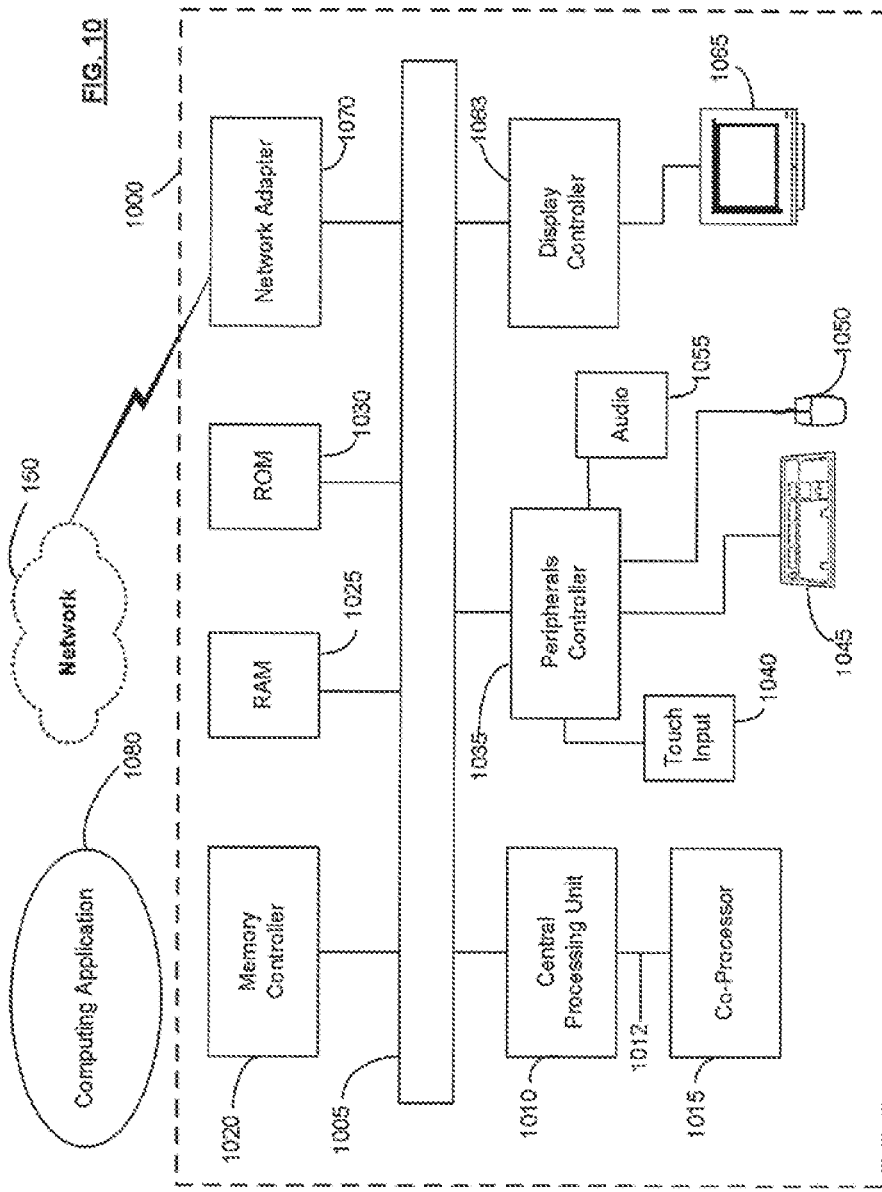
FIG. 10 is a block diagram of a computing environment with which aspects of the subject matter described herein may be deployed.

FIG. 10 depicts a block diagram of example computing system 1000 that may be used to implement the systems and methods described herein. For example, computing system 1000 may be used to implement any of devices 110a-f. Computing system 1000 may be controlled primarily by computer readable instructions that may be in the form of software. For example, computing system 1000 may be controlled by a computing application 1080 which comprises instructions for performing functionality consistent with that described herein. The computer readable instructions may include instructions for computing system 1000 for storing and accessing computer readable instructions themselves. Such software may be executed within central processing unit (CPU) 1010 to cause computing system 1000 to perform the processes or functions associated therewith. In many known computer servers, workstations, personal computers, or the like, CPU 1010 may be implemented by micro-electronic chip CPUs called microprocessors.

In operation, CPU 1010 may fetch, decode, and/or execute instructions and may transfer information to and from other resources via a main data-transfer path or system bus 1005. Such a system bus may connect the components in computing system 1000 and may define the medium for data exchange. Computing system 1000 may further include memory devices coupled to system bus 1005. According to an example embodiment, the memory devices may include random access memory (RAM) 1025 and read only memory (ROM) 1030. RAM 1025 and ROM 1030 may include circuitry that allows information to be stored and retrieved. In one embodiment, ROM 1030 may include stored data that cannot be modified. Additionally, data stored in RAM 1025 typically may be read or changed by CPU 1010 or other hardware devices. Access to RAM 1025 and/or ROM 1030 may be controlled by memory controller 1020. Memory controller 1020 may provide an address translation function that translates virtual addresses into physical addresses as instructions are executed.

In addition, computing system 1000 may include peripherals controller 1035 that may be responsible for communicating instructions from CPU 1010 to peripherals, such as, touch sensitive input 1040, keyboard 1045, mouse 1050, and audio input and output device 1055. Computing system 1000 may further include display 1065 that may be controlled by display controller 1063. Display 1065 may be used to display visual output generated by computing system 1000 and may correspond to display apparatus 200 discussed herein. Such visual output may include text, graphics, animated graphics, video, or the like. Display controller 1063 may include electronic components that generate a video signal that may be sent to display 1065. Further, computing system 1000 may include network adaptor 1070 that may be used to connect computing system 2000 to an external communication network such as network 150, described above in connection with FIG. 1.

Thus, applicants have disclosed example embodiments of systems and methods for performing user interface processing. Applicants disclose systems and methods for displaying a first output and simultaneously displaying a second output corresponding to user input superimposed on the first output. In an area of the display that the first output and the second output overlap, the second output is opaque and the first output is visible through the opaque second output. In an area of the display that the first output and the second output do not overlap, the first output is visible.

It should be understood that the various techniques described herein may be implemented in connection with hardware or software or, where appropriate, with a combination of both. Thus, the methods and apparatus of the subject matter described herein, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the subject matter described herein. In the case where program code is stored on media, it may be the case that the program code in question is stored on one or more media that collectively perform the actions in question, which is to say that the one or more media taken together contain code to perform the actions, but that—in the case where there is more than one single medium—there is no requirement that any particular part of the code be stored on any particular medium. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the subject matter described herein, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although example embodiments may refer to utilizing aspects of the subject matter described herein in the context of one or more stand-alone computer systems or devices, the subject matter described herein is not so limited, but rather may be implemented in connection with any computing environment, such as a network or distributed computing environment. Still further, aspects of the subject matter described herein may be implemented in or across a plurality of processing chips or devices, and storage may similarly be spread across a plurality of devices. Such devices might include personal computers, network servers, handheld devices, supercomputers, or computers integrated into other systems such as automobiles and airplanes.

Although the subject matter has been described in language specific to structural features and/or methodological acts, it is to be understood that the subject matter defined in the appended claims is not necessarily limited to the specific features or acts described above. For example, several example scenarios have been described involving display of a video portion of an audio/video telephone conference and superimposing annotations received from a touch sensitive screen or display. However, the methods and systems described herein may apply to any combination of output types. For example, a first output may be a video stream that is not portion of a telephone conference. The first output may be a still image. The second output may be entered through a keyboard as opposed to a touch sensitive screen. The specific features and acts described above are disclosed as example forms of implementing the subject matter of the below-listed claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed:

1. A method for user interface processing, the method comprising:
   playing a video on a display;
   receiving an input on a spatial location of the display associated with a portion of the video simultaneously with the video being played and while the video continues to play on the display;
   displaying, on the display, an output superimposed on the video at a location on the display that corresponds to the spatial location associated with the portion of the video where the input was received and at a time simultaneously with the input being received, wherein the output corresponds to the received input, wherein the received input includes one or more annotations, and wherein the output is movable to another location of the display in response to another input;
   mapping data indicative of the output into, over, or both, buttered data for the portion of the video, such that the output appears superimposed on the video while the video continues to play on the display and the input is received on the display,
   wherein in an area of the display that the video and the output overlap, the video is visible through the output, and
   wherein in an area of the display that the video and the output do not overlap, the video is visible;
   storing the received input;
   storing the video;
   retrieving the video and the one or more annotations separately and independently; and and
   displaying the retrieved video and the retrieved one or more annotations separately and independently.

2. The method of claim 1, wherein receiving the input comprises receiving the input via a touch sensitive screen.

3. The method of claim 1, wherein receiving the input comprises receiving the input via computerized voice recognition.

4. The method of claim 1, wherein playing the video comprises playing a video stream of an audio/video conference.

5. The method of claim 1, further comprising:
   storing information that synchronizes the retrieved one or more annotations with the retrieved video;
   retrieving the information that synchronizes the retrieved one or more annotations with the retrieved video; and
   displaying the retrieved video and the retrieved one or more annotations, the retrieved one or more annotations superimposed on and synchronized with the retrieved video.

6. The method of claim 1, wherein playing the video comprises playing a first portion of the video and playing a second portion of the video, the method further comprising:
   receiving the second portion of the video while playing the first portion of the video.

7. The method of claim 1, further comprising moving the output automatically or in response to the another input to have a smaller amount of overlap with the video.

8. An apparatus, comprising:
   a display;
   an input device; and
   a computing processor, the computing processor communicatively coupled with the display and the input device;
   wherein the apparatus is configured to:
   play a video on the display;
   receive, via the input device, an input simultaneously with the video being played and on a spatial location of the display that includes at least a portion of the video;
   display, on the display, an output superimposed over the video at the spatial location of the display that includes the at least the portion of the video, wherein the output corresponds to the received input, and wherein the output is movable to another location of the display in response to another input;
   map data indicative of the output into, over, or both, buffered data for the at least the portion of the video, such that the output appears superimposed on the video while the input is received simultaneously with the video being played;
   adjust a level of opaqueness of the output,
   wherein the video is visible through the output;
   store the received input, the received input comprising one or more annotations;
   store the video;
   retrieve the video and the one or more annotations separately and independently; and
   display the retrieved video and the retrieved one or more annotations separately and independently.

9. The apparatus of claim 8, wherein the output comprises the one or more annotations.

10. The apparatus of claim 9, wherein the input device comprises a touch sensitive screen.

11. The apparatus of claim 9, wherein the input device comprises computerized voice recognition.

12. The apparatus of claim 9, wherein the apparatus is further configured to:

store information that synchronizes retrieved one or more annotations with the retrieved video;

retrieve the information that synchronizes the retrieved one or more annotations with the retrieved video; and display the retrieved video and the retrieved one or more annotations, the retrieved one or more annotations superimposed on and synchronized with the retrieved video.

13. The apparatus of claim 8, wherein the apparatus is configured to play the video by playing a video stream of an audio/video conference.

14. The apparatus of claim 8, wherein the video comprises a first portion of the video and a second portion of the video, wherein the apparatus is further configured to:

receive the second portion of the video while playing the first portion of the video.

15. The apparatus of claim 8, wherein the apparatus is further configured to move the output automatically or in response to the another input to have a smaller amount of overlap with the video.

16. A non-transitory computer readable medium that stores executable instructions that, in response to execution, cause one or more processors to perform or control performance of operations to:

play a video on a display;

identify an input on a spatial location of the display playing the video simultaneously with playing the video;

display, on the display, at the spatial location of the display where the input was identified, an output superimposed on the video, wherein the output corresponds to the identified input, and wherein the output is movable to another location of the display in response to another input;

continue to play the video on the display while the input is identified and the output is displayed;

map data indicative of the output into, over, or both, buffered data for the video, such that the output appears superimposed on the video while the video continues to play on the display and the input is identified on the display, wherein in an area of the display that the video and the output overlap, the output is visible and the video is partially obscured but visible through the displayed output, and wherein in an area of the display that the video and the output do not overlap, the video is visible;

store the identified input, the identified input comprising one or more annotations;

store the video;

retrieve the video and the one or more annotations separately and independently; and display the retrieved video and the retrieved one or more annotations separately and independently.

17. The non-transitory computer readable medium of claim 16, wherein the operations to display the output comprise operations to display the one or more annotations.

18. The non-transitory computer readable medium of claim 17, wherein the operations to identify the input comprise operations to identify the input via a touch sensitive screen.

19. The non-transitory computer readable medium of claim 17, wherein the operations to identify the input comprise operations to identify the input via computerized voice recognition.

20. The non-transitory computer readable medium of claim 17, wherein the executable instructions comprise instructions that, in response to execution, cause the one or more processors to perform or control performance of at least one operation to:

store information that synchronizes the retrieved one or more annotations with the retrieved video; and display the retrieved video and the retrieved one or more annotations, the retrieved one or more annotations superimposed on and synchronized with the retrieved video.

21. The non-transitory computer readable medium of claim 16, wherein the operations to play the video comprise operations to play a first portion of the video and operations to play a second portion of the video, and wherein the executable instructions comprise instructions that, in response to execution, cause the one or more processors to perform or control performance of at least one operation to:

identify the second portion of the video while playing the first portion of the video.

22. The non-transitory computer readable medium of claim 16, wherein the executable instructions comprise instructions that, in response to execution, cause the one or more processors to perform or control performance of at least one operation to move the output automatically or in response to the another input to have a smaller amount of overlap with the video.

* * * * *

UNITED STATES PATENT AND TRADEMARK OFFICE
CERTIFICATE OF CORRECTION

| | | |
|---|---|---|
| PATENT NO. | : 9,715,326 B2 | Page 1 of 1 |
| APPLICATION NO. | : 13/502011 | |
| DATED | : July 25, 2017 | |
| INVENTOR(S) | : Yuan | |

It is certified that error appears in the above-identified patent and that said Letters Patent is hereby corrected as shown below:

In the Specification

In Column 1, Lines 6-7, delete "tiling under 35 U.S.C. 371 of" and insert -- filing under 35 U.S.C. § 371 of --, therefor.

In the Claims

In Column 13, Line 55, in Claim 1, delete "buttered data" and insert -- buffered data --, therefor.

In Column 13, Line 67, in Claim 1, delete "independently; and and" and insert -- independently; and --, therefor.

In Column 15, Line 1, in Claim 12, delete "synchronizes retrieved" and insert -- synchronizes the retrieved --, therefor.

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*